United States Patent [19]
Wangsness
[11] 3,784,853
[45] Jan. 8, 1974

[54] HOMOPOLAR MOTOR FORMING A SOUND RECORD SUPPORT

[76] Inventor: Peter A. A. Wangsness, 5035 E. Scarlett, Tucson, Ariz. 85711

[22] Filed: May 3, 1972

[21] Appl. No.: 250,019

[52] U.S. Cl. ................. 310/178, 310/268, 274/1 E, 274/39
[51] Int. Cl. ........................................... H02k 31/00
[58] Field of Search ...................... 310/178, 268, 51, 310/49; 340/174.1 C, 174.1 E; 274/1 E, 39

[56] References Cited

UNITED STATES PATENTS

| | | | |
|---|---|---|---|
| 1,480,553 | 1/1924 | Hoff | 274/1 E |
| 1,316,552 | 9/1919 | Apple | 274/1 E |
| 3,529,191 | 9/1970 | Henry-Baudot | 310/178 |
| 2,247,648 | 7/1941 | Blessing | 274/39 |
| 3,333,130 | 7/1967 | Brouee | 310/178 |
| 3,513,340 | 5/1970 | Appleton | 310/178 |
| 2,088,729 | 8/1937 | Taylor | 310/178 |

FOREIGN PATENTS OR APPLICATIONS

| | | | |
|---|---|---|---|
| 1,393,571 | 2/1965 | France | 310/178 |

*Primary Examiner*—R. Skudy
*Attorney*—Harvey B. Jacobson

[57] ABSTRACT

A sound record moving device for a sound recording and reproducing apparatus has a base member and a turntable mounted for rotation on the base member. The turntable is constructed from an electrically conductive material. A magnet is arranged near the periphery of the turntable, and a device in contact with the turntable feeds a current thereto. The turntable, magnet, and current feeding device are arranged cooperatively to form a homopolar motor, with the turntable functioning as the armature of such motor.

7 Claims, 5 Drawing Figures

HOMOPOLAR MOTOR FORMING A SOUND RECORD SUPPORT

BACKGROUND OF THE INVENTION

1. Field of the Invention

This invention relates in general to a sound record moving device for a sound recording and reproducing apparatus, and in particular to a motor having a movable element forming a means for directly moving a sound record.

2. Description of the Prior Art

A major problem encountered in the sound recording and reproducing art is to obtain turntable mountings and drives which will permit constant speed, substantially vibration free operation. Conventionally, sound record moving devices employ a synchronous motor to the shaft of which a turntable is mounted for rotation. The turntable may be either mounted on the shaft for rotation therewith, or for rotation with respect thereto. However, synchronous motors are dependent upon the frequency applied thereto for speed control, and vibrations are inherent to this type of motor. Further, the use of mechanical bearings between the motor shaft and the turntable induces additional vibrations. Another problem encountered with synchronous motors is that the trend toward lower turntable speeds has resulted in speed requirements below the optimum range of accurate rotational speed for this type of motor. As a result, the motor must be connected to the turntable by means of gearing, necessarily increasing the complexity of the system and producing additional vibration, or the motor must be relatively large to run at such slow speeds, thus increasing the size and weight of the sound record moving device.

Previous attempts have been made to reduce the vibration in a sound reproducing system. Examples of such arrangements may be found in U.S. Pat. Nos. 2,157,158, 2,207,251, and 2,247,648. These known structures all attempt to attach the armature of the motor to a conventional turntable. However, these known arrangements still require the use of synchronous motors and mechanical bearings between the motor and the turntable.

Electrical rotating machinery is known in which a rotatable disc is placed between the poles of a magnet and is either rotated about an axis to produce a direct current, or a direct current is applied thereto between the axle on which the disc is rotatably mounted and the periphery thereof for causing the disc to rotate. This principle was first discovered by Faraday, and the disc is generally referred to as a Faraday disc. A generator or motor thus constructed is usually referred to as a homopolar machine. The peculiar characteristic of such a homopolar machine is that each conductor always cuts the flux in the same direction. This results in the EMF induced in the disc to always be in the same direction, instead of alternating as in other DC machines. Thus, the commutator may be eliminated. Theoretically, a homopolar machine is free of vibration, and in practice is vertially vibration free. An example of a homopolar machine having a disc-like rotor may be found in U.S. Pat. No. 3,529,191.

U.S. Pat. No. 3,379,948, for example, discloses a sound record moving device, specifically a tape transport drive system, which employs homopolar motors to drive tape reels. However, this known arrangement drives the tape reels by connecting same to the shaft of the motor in the conventional manner of driving tape reels. If a turntable were substituted for the tape reel, mechanical mounting structure with its inherent vibration problems would still be present in the resulting system.

An example of the use of the armature of a homopolar motor as a load supporting member may be found in U.S. Pat. No. 3,616,761. However, this known application of homopolar motors uses the armature thereof to support cars of a locomotive railway on the tracks of the railway. That is, the armatures serve as car wheels. It is to be recognized, of course, that the use of the armature of a homopolar motor to support a railroad car or other vehicle is not even remotely related to the problem of providing constant speed, substantially vibration free drives for moving sound records.

SUMMARY OF THE INVENTION

It is an object of the present invention to provide a sound record moving device for a sound recording and reproducing apparatus which will permit constant speed and substantially vibration free performance.

It is another object of the present invention to provide such a sound recording moving device which is independent of the frequency of the applied current.

These and other objects are achieved according to the present invention by providing a motor including a movable element forming a means for directly moving a sound record. This movable element may be in the form of a disc for receiving a sound record thereon. Alternatively, this disc may drive the sound record by peripheral friction contact therewith.

According to a preferred embodiment of the present invention, the disc is constructed from an electrically conductive material, and the motor is further provided with a magnet arranged adjacent the disc for creating a magnetic field therein. The motor further has an arrangement for feeding a current to the disc for causing same to rotate. Thus, the disc, the magnet, and the current feeding arrangement form a homopolar motor.

In one preferred embodiment according to the present invention, the motor has a base member, and is provided with a shaft rotatably mounted to the base member. This shaft is advantageously constructed from an electrically conductive material, and is connected to the disc at a center point thereof. The shaft is arranged so as to project from a sound record receiving surface of the disc for forming a spindle for cooperating with a hole in a sound record disc. In this embodiment, the current feeding arrangement may be arranged in electrically conductive contact with the shaft. A coating of an electrically insulating material may be applied to the sound record receiving surface and the shaft for electrically insulating exposed portions of the sound record moving device.

In another preferred embodiment of the present invention, members are associated with the disc and base member for guiding the disc in a direction parallel to the plane of the disc. In this embodiment, the current may be fed to the disc either through the centrally mounted shaft or through the guiding members.

In both of the preferred embodiments referred to above, the disc may be mounted with respect to the base member by magnets associated with both the disc and the base member for repulsing one from the other and forming a bearing. Low friction bearings, such as fluid bearings, preferably mount the shaft and guide members to the base member.

In this specification, the term "sound record" in general refers to any type of such record, including disc, cylinder, belt, tapes, and the like.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figures 1, 4, 5:
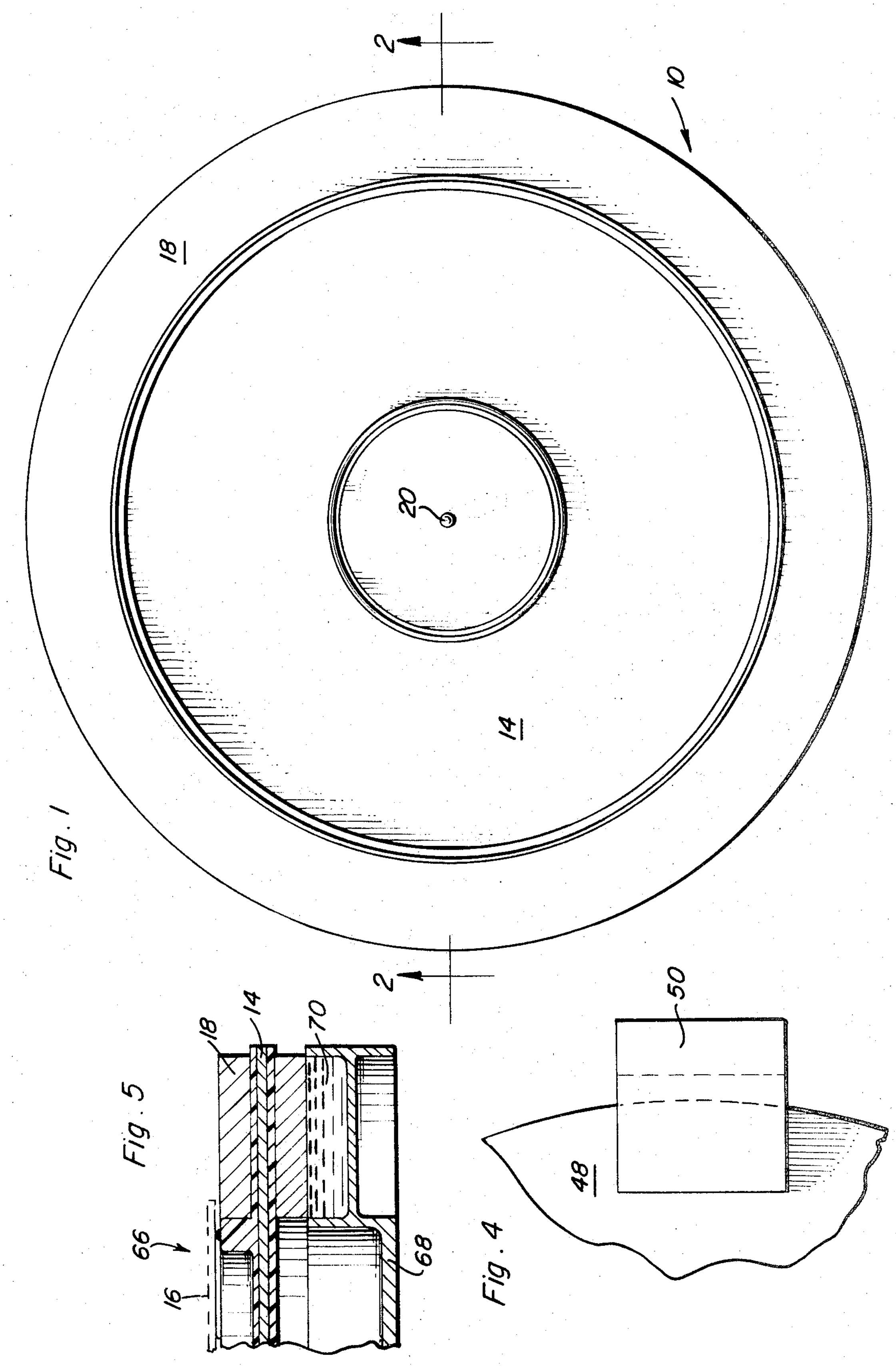
FIG. 1 is a top plan view showing a sound moving device according to the present invention.
FIG. 4 is a fragmentary, top plan view looking in the direction of the arrows 4—4 of FIG. 3.
FIG. 5 is a fragmentary, vertical longitudinal sectional view showing a modification of the embodiment of FIGS. 1 and 2.
Figures 2, 3:
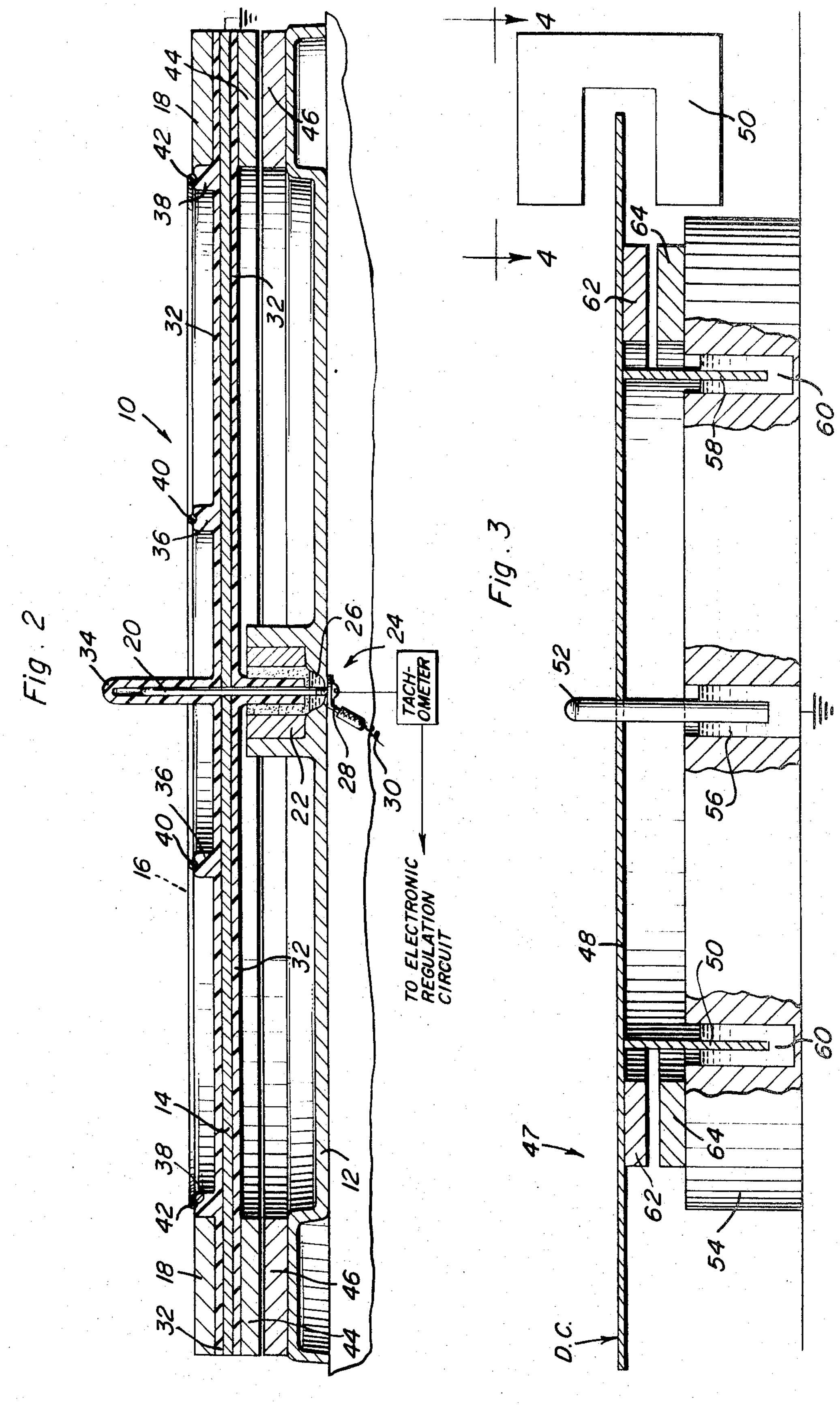
FIG. 2 is a partly schematic, sectional view taken generally on the line 2—2 of FIG. 1.
FIG. 3 is a partly schematic, sectional view similar to FIG. 2 showing another preferred embodiment according to the present invention.

FIGS. 1 and 2 of the drawings show a sound record moving device 10 according to the present invention. This device 10 s provided with a base member 12, and a disc 14 for directly moving around a sound record 16. Although a disc 14 is shown in FIGS. 1 and 2, it is to be understood that movable elements of other configurations may be employed. Further, record 16 may be a cylinder, belt, tape, and the like. Disc 14 may be constructed from electrically conductive material, such as a suitable metal. Among such suitable metals is, of course, copper or aluminum.

A magnet 18 is arranged adjacent the periphery of disc 14 for creating a magnetic field therein. Magnet 18 may be formed by a pair of generally annular shaped magnets having opposed poles arranged adjacent to and bracketing at least a portion of the periphery of disc 14.

Device 10 is provided with a shaft 20 rotatably mounted to base member 12 as by a bearing 22. A suitable, known fluid, such as ferro-fluid, may be used for bearing 22, or any other known type of low friction bearing may be employed. Shaft 20 is connected to disc 12 at the center point thereof, and projects from a sound record receiving surface of disc 14 for forming a spindle for cooperating with a hole in a sound record 16. A current feeding arrangement 24 may be arranged in electrically conductive contact with shaft 20. This arrangement 24 causes disc 14 to rotate when provided with a magnetic field by magnet 18. Thus, disc 14, magnet 18, and arrangement 24 forms a homopolar motor. Arrangement 24 may have a liquid bath or solid material 26 arranged in continuous contact with the lower end of shaft 20. A suitable liquid material is, for example, mercury. A lug 28 is in electrical contact with bath or material 26, and is connected to a source of direct current as by a lead 30. The source of direct current is not shown, but may be any conventional, known source, such as a battery. The direction of rotation is a function of the polarity of the applied current, while the speed of rotation is a function of the voltage. In FIG. 2, disc 14 is shown as grounded.

Preferably, the record receiving surface and the spindle forming portion of said shaft have a coating or layer 32, 34 of an electrically insulating material. This coating or layer 32, 34 prevents users of device 10 from receiving an electrical shock. Ridges 36, 38 are provided on the record receiving surface of disc 10 for supporting a sound record 16. Preferably, these ridges 36, 38 are arranged so as to mate with a record disc record 16 inside and outside of the recorded grooves of the record disc. O-rings 40, 42 constructed from, for example, a suitable, known rubber-like material, may be arranged in grooves on ridges 36, 38 for contacting the record 16.

Advantageously, magnets 44, 46 may be associated with disc 14 and base member 12, respectively, for repulsing one from the other in forming a bearing. Magnet 44 may form a portion of magnet 18, as shown. Device 10 may be used with an automatic changer in a known manner as by providing a conventional automatic spindle and a trigger in the tone arm (not shown).

Referring now to FIGS. 3 and 4 of the drawings, a sound record moving device 47 is shown which has a disc 48 having a periphery arranged between the poles of a magnet 50. A shaft 52 is centrally arranged in disc 48, and is rotatably mounted in a base member 54 as by a suitable, known bearing 56. Bearing 56 may be any type of bearing selected for bearing 22. Longitudinal guide members 58 associated with disc 48 are arranged extending into an annular guide 60 associated with base member 54 for guiding disc 48 in a direction parallel to the plane thereof. Guide members 58 may be either a plurality of separate such members, or may be only a singular, annular member. Magnets 62, 64 may be provided for repulsing disc 48 and base member 54 one from the other and forming a bearing in the manner of magnets 44, 46. In FIG. 3, disc 48 is fed a current, and shaft 52 is grounded. This could be reversed if desired. Alternatively, guide 60 could be either grounded or fed a current.

It is to be understood that although magnet 50 is shown in FIG. 4 as only a rectangular shaped element, magnet 50, if desired, could be an annular element in the manner of magnet 18. Alternatively, magnet 18 need not be circular, provided any noncircular portion of magnet 18 is mounted on an outside mounting member (not shown). In addition, magnet 44 need not be part of magnet 18, but an additional portion (not shown) may be provided to complete magnet 18.

FIG. 5 shows a sound record moving device 66 which is similar to the embodiment illustrated in FIGS. 1 and 2, except that a base member 68 is provided which has a cavity for containing a suitable, known fluid 70 to form a fluid bearing in place of the magnetic bearing of device 10.

The present invention achieves the merging of a motor and a turntable. That is, the armature of the motor itself forms the turntable. The advantages of this construction will be immediately apparent to those skilled in the art. Virtually no vibration is produced by this system—the theoretical vibration being zero. While systems using an AC motor are dependent on line frequency for speed control, a sound record moving device according to the present invention is dependent only on voltage. A voltage regulating circuit will make it nearly independent of power source (AC or DC), or voltage. The use of permanent magnets gives stability to the system and increases the lifetime thereof as compared to known constructions. Such devices are relatively cheap to produce, using a minimum of different parts, and adapt readily to manufacture with various materials. Further, battery operation makes a device according to the present invention ideal for use in portable units.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A motor including a movable element in the form of a disc means for receiving a sound record thereon and forming a means for directly moving a sound record, said disc means being constructed from an electrically conductive material, and the motor further including means arranged adjacent said disc for creating a magnetic field in said disc means and means for feeding a current to said disc means for causing same to rotate, said disc means, the magnetic field creating means, and the current feeding means forming a homopolar motor, the motor still further including a base member and provided with a shaft rotatably mounted to said base member, constructed from an electrically conductive material, and connected to said disc means at a center point thereof, said shaft projecting from a sound record receicing surface of said disc means for forming a spindle for cooperating with a hole in the record, the current feeding means being arranged in electrically conductive contact with said shaft, and magnetic means associated with said disc means and base member for repulsing one member from the other and forming a bearing.

2. A motor including a movable element in the form of a disc means for receiving a sound record thereon and forming a means for directly moving a sound record, said disc means being constructed from an electrically conductive material, and the motor further including means arranged adjacent said disc for creating a magnetic field in said disc means and means for feeding a current to said disc means for causing same to rotate, said disc means, the magnetic field creating means, and the current feeding means forming a homopolar motor, and the motor further including a base member, magnetic means associated with said disc means and base member for repulsing one member from the other and forming a bearing, and means also associated with said disc means and base member for guiding said disc means in a direction parallel to the plane of said disc means.

3. A structure as defined in claim 2, wherein said disc has a coating of an electrically insulating material.

4. A motor including a movable element in the form of a disc means for receiving a sound record thereon and forming a means for directly moving a sound record, said disc means being constructed from an electrically conductive material, and the motor further including means arranged adjacent said disc means for creating a magnetic field in said disc means, the magnetic field creating means being a pair of magnets having opposed poles adjacent and arranged bracketing at least a portion of the periphery of said disc means, and means for feeding a current to said disc means for causing same to rotate, said disc means, the magnetic field creating means, and the current feeding means forming a homopolar motor.

5. A structure as defined in claim 4, wherein the motor includes a base member and is provided with a shaft rotatably mounted to said base member, constructed from an electrically conductive material, and connected to said disc means at a center point thereof, said shaft projecting from a sound record receiving surface of said disc means for forming a spindle for cooperating with a hole in the record, the current feeding means being arranged in electricaly conductive contact with said shaft.

6. A structure as defined in claim 5, wherein said record receiving surface and the spindle forming portion of said shaft have a coating of an electrically insulating material.

7. A sound record moving device for a sound recording and reproducing apparatus, comprising, in combination:

a. a base member;

b. means for directly moving a sound record;

c. means for movably mounting the moving means to said base member; and d. magnetic means associated with the moving means and base member for repulsing one from the other and forming a bearing.

* * * * *